United States Patent
Kwon

(10) Patent No.: US 11,601,723 B2
(45) Date of Patent: Mar. 7, 2023

(54) MEDIA-PROVIDING SYSTEM, METHOD AND COMPUTER PROGRAM FOR PROCESSING ON-DEMAND REQUESTS FOR COMMERCE CONTENT

(71) Applicant: SK STOA CO., LTD., Seoul (KR)

(72) Inventor: Min Hee Kwon, Seoul (KR)

(73) Assignee: SK STOA CO., LTD., Seoul (KR)

( * ) Notice: Subject to any disclaimer, the term of this patent is extended or adjusted under 35 U.S.C. 154(b) by 0 days.

(21) Appl. No.: 17/462,970

(22) Filed: Aug. 31, 2021

(65) Prior Publication Data
US 2022/0078525 A1    Mar. 10, 2022

(30) Foreign Application Priority Data
Sep. 4, 2020  (KR) .................. 10-2020-0113202

(51) Int. Cl.
| | |
|---|---|
| *H04N 21/478* | (2011.01) |
| *H04N 21/472* | (2011.01) |
| *H04N 21/643* | (2011.01) |
| *H04N 21/488* | (2011.01) |

(Continued)

(52) U.S. Cl.
CPC ... *H04N 21/47815* (2013.01); *G06Q 30/0277* (2013.01); *H04N 21/2393* (2013.01); *H04N 21/47202* (2013.01); *H04N 21/4882* (2013.01); *H04N 21/64322* (2013.01)

(58) Field of Classification Search
CPC ............. H04N 21/812; H04N 21/4622; H04N 21/4782; H04N 21/47815
See application file for complete search history.

(56) References Cited

U.S. PATENT DOCUMENTS

| | | | |
|---|---|---|---|
| 6,377,986 B1 * | 4/2002 | Philyaw | G06Q 30/0601 707/E17.115 |
| 10,306,000 B1 * | 5/2019 | Isacks | H04L 65/1016 |

(Continued)

FOREIGN PATENT DOCUMENTS

| | | |
|---|---|---|
| KR | 100593788 B1 | 6/2006 |
| KR | 1020150142343 A | 12/2015 |
| KR | 1020190092887 A | 8/2019 |

OTHER PUBLICATIONS

Office Action issued in Korean counterpart Application No. 1020200113202 dated Sep. 23, 2021, 5 pages.

*Primary Examiner* — Jason Salce
(74) *Attorney, Agent, or Firm* — Burris Law, PLLC

(57) ABSTRACT

A method for transmitting, by a media-providing server, on-demand content related to commerce content to a set-top box includes receiving a first on-demand request signal for the on-demand content from the set-top box and transmitting the first on-demand request signal to a data server, by the media-providing server, in response to the first on-demand request signal, generating an on-demand call request signal including a product code of the commerce content and a user code of the set-top box and transmitting the on-demand call request signal to an on-demand ARS server, by the data server; receiving process status information on the on-demand call request signal from the on-demand ARS server and transmitting a message corresponding to the process status information to a user terminal corresponding to the first on-demand request signal, by the data server.

20 Claims, 13 Drawing Sheets

(51) Int. Cl.
  *H04N 21/239* (2011.01)
  *G06Q 30/0241* (2023.01)

(56) References Cited

U.S. PATENT DOCUMENTS

| | | | | |
|---|---|---|---|---|
| 2003/0014754 | A1* | 1/2003 | Chang | H04N 21/4622 |
| | | | | 348/51 |
| 2005/0160015 | A1* | 7/2005 | Shin | G06Q 30/0637 |
| | | | | 705/26.82 |
| 2006/0111058 | A1* | 5/2006 | Grant | H04M 19/08 |
| | | | | 455/425 |
| 2008/0002670 | A1* | 1/2008 | Bugenhagen | H04L 65/80 |
| | | | | 370/352 |
| 2008/0033835 | A1* | 2/2008 | Philyaw | G06Q 30/0601 |
| | | | | 707/E17.115 |
| 2011/0145846 | A1* | 6/2011 | Kim | H04N 21/2542 |
| | | | | 725/62 |
| 2014/0173659 | A1* | 6/2014 | Park | H04N 21/47815 |
| | | | | 725/40 |
| 2014/0359644 | A1* | 12/2014 | Kumar | H04N 21/23418 |
| | | | | 725/60 |
| 2019/0013017 | A1* | 1/2019 | Kang | G06N 5/04 |
| 2021/0321158 | A1* | 10/2021 | Myoung | H04N 21/6581 |
| 2021/0329346 | A1* | 10/2021 | Myoung | H04N 21/6131 |

* cited by examiner

MEDIA-PROVIDING SYSTEM, METHOD AND COMPUTER PROGRAM FOR PROCESSING ON-DEMAND REQUESTS FOR COMMERCE CONTENT

CROSS-REFERENCE TO RELATED APPLICATION

This application is based on and claims priority under 35 U.S.C. § 119 to Korean Patent Application No. 10-2020-0113202, filed on Sep. 4, 2020, in the Korean Intellectual Property Office, the disclosure of which is incorporated by reference herein in its entirety.

BACKGROUND

1. Field

The present disclosure relates to a media-providing system and method for processing an on-demand request for commerce content, and a computer program for the same.

2. Description of the Related Art

Recently, with the development of TV technology and digital technology, a wide range of information is being delivered to viewers through TVs. For example, in TV home shopping, in which shopping information is provided through a TV, a wide variety of information is provided according to technological change. Meanwhile, with the recent commercialization of digital-based digital television technology, it has become possible to provide a wide variety of content through a network such as the internet connected to each home, and a representative example of this is an internet protocol television (IPTV) service.

In an IPTV service, various services may be provided to IPTV service subscribers through a set-top box installed in a designated space such as a home, and among them, a shopping broadcasting service (or commerce broadcasting) provided through a commerce channel may also be provided.

In a case of a commerce business operator producing a shopping broadcasting service, a commerce channel (that is, the shopping broadcasting service) may be scheduled in a channel that is given/promised with a time slot based on a contract between IPTV service subscribers and IPTV service providers.

Accordingly, when an IPTV service subscriber selects a channel promised in the set-top box, the set-top box receives a commerce broadcast which is regularly scheduled for the selected channel, and outputs the commerce broadcast through TV. Therefore, the IPTV service subscriber may view the commerce broadcast and use the shopping broadcasting service. However, convenience for an IPTV service subscriber, such as the delivery of a wide variety of shopping information according to a user's request, checking shopping information, and ordering, may be improved.

SUMMARY

Embodiments of the present disclosure may process an on-demand request for commerce contents.

Additional aspects will be set forth in part in the description which follows and, in part, will be apparent from the description, or may be learned by practice of the presented embodiments of the disclosure.

According to an embodiment of the present disclosure, there is provided a method including: transmitting, by a media-providing server, an on-demand content related to the commerce content to a set-top box; receiving a first on-demand request signal for the on-demand content from the set-top box, and transmitting the first on-demand request signal to a data server, by the media-providing server; in response to the first on-demand request signal, generating an on-demand call request signal including a product code of the commerce content and a user code of the set-top box and transmitting the on-demand call request signal to an on-demand ARS server, by the data server; and receiving process status information on the on-demand call request signal from the on-demand ARS server and transmitting a message corresponding to the process status information to a user terminal corresponding to the first on-demand request signal, by the data server.

The method further includes, when the process status information on the on-demand call request signal is unavailable, generating a message including a function of regenerating the on-demand call request signal, in response to call inability, and transmitting the message to the user terminal corresponding to the first on-demand request signal, by the data server.

The media-providing server determines whether the second on-demand request signal is a redundant order attempt when receiving a second on-demand request signal for the on-demand content from the set-top box, when the second on-demand request signal is the redundant order attempt, transmits guide pop-up data indicating that a redundant order attempt has been made to the set-top box; and skips the process of the second on-demand request signal.

The method further includes receiving waiting order information included in the process status information from the data server, generating guide pop-up data corresponding to the waiting order information, and transmitting the guide pop-up data to the set-top box, by the media-providing server.

The method further includes receiving waiting order information included in the process status information from the data server, generating guide pop-up data indicating that a maximum number of waiting orders is exceeded when detecting that the waiting order information exceeds a preset maximum number of waiting orders, and transmitting the guide pop-up data to the set-top box, by the media-providing server; and receiving, from the set-top box, a check request signal for the guide pop-up data indicating that the waiting order is exceeded, and in response to the check request signal, transmitting the first on-demand request signal to the ARS server through the data server, by the media-providing server.

The method further includes generating a message including a function of regenerating the on-demand call request signal corresponding to call inability, and transmitting the message to the user terminal corresponding to first on-demand request signal, when the process status information on the on-demand call request signal is unavailable, by the media-providing server.

The method further includes generating a message including a function of regenerating the on-demand call request signal corresponding to call inability, and transmitting the message to the user terminal corresponding to first on-demand request signal, when the process status information on the on-demand call request signal is unavailable, by the on-demand ARS server.

The method further includes generating guide pop-up data including a function of regenerating the on-demand call request signal corresponding to call inability, and transmitting the guide pop-up data to the set-top box, when the process status information on the on-demand call request signal is unavailable, by the media-providing server.

According to an embodiment of the present disclosure, a method of processing an on-demand request for commerce content is provided. The method includes steps of: (i) transmitting, by a media-providing server, on-demand content related to commerce content to a set-top box, (ii) receiving a first on-demand request signal for the on-demand content from the set-top box and transmitting the first on-demand request signal to a data server, by the media-providing server, (iii) in response to the first on-demand request signal, generating, by the data server, an on-demand call request signal including a product code of the commerce content and a user code of the set-top box and transmitting the on-demand call request signal to an on-demand ARS server, and (iv) receiving process status information on the on-demand call request signal from the on-demand ARS server and transmitting, by the data server, a first message corresponding to the process status information to a user terminal corresponding to the first on-demand request signal.

In at least one variant, when the process status information on the on-demand call request signal is unavailable, the method further includes generating a second message including a function of regenerating the on-demand call request signal, in response to call inability, and transmitting, by the data server, the message to the user terminal corresponding to the first on-demand request signal.

In another variant, the method further includes (i) receiving a second on-demand request signal for the on-demand content from the set-top box, (ii) determining, with the media providing server, whether the second on-demand request signal is a redundant order attempt of the first on-demand request signal, (iii) upon determination that the second on-demand request signal is the redundant order attempt, transmitting, with the media providing server, guide pop-up data indicating that a redundant order attempt has been made to the set-top box, and (iv) skipping, with the media providing server, the process of the second on-demand request signal.

In another variant, the method further includes receiving waiting order information included in the process status information from the data server, generating guide pop-up data corresponding to the waiting order information; and transmitting the guide pop-up data to the set-top box, by the media-providing server.

In further another variant, the method further includes (i) receiving waiting order information included in the process status information from the data server, (ii) generating guide pop-up data indicating that a maximum number of waiting orders is exceeded when detecting that the waiting order information exceeds a preset maximum number of waiting orders, (iii) transmitting the guide pop-up data to the set-top box, by the media-providing server, (iv) receiving, from the set-top box, a check request signal for the guide pop-up data indicating that the waiting order is exceeded, and (v) in response to the check request signal, transmitting the first on-demand request signal to the on-demand ARS server through the data server, by the media-providing server.

According to an embodiment of the present disclosure, a method of processing an on-demand request includes steps of (i) receiving, from a subscriber machine, a first on-demand request signal in response to on-demand content at a first server, (ii) in response to the first on-demand request signal, generating, with a second server, an on-demand call request signal including a content identification code associated with the on-demand content and a subscriber code, (iii) generating, with a third server, process status information on the on-demand call request signal, and (iv) generating, with the second server, a first message corresponding to the process status information to the subscriber machine.

In at least one variant, the method further includes (i) when the process status information on the on-demand call request signal is unavailable, generating a second message including a function of regenerating the on-demand call request signal, in response to call inability, and (ii) transmitting, by the second server, the second message to the subscriber machine.

In another variant, the method further includes (i) receiving, from the subscriber machine, a second on-demand request signal for the on-demand content, (ii) determining, with the first server, whether the second on-demand request signal is a redundant order attempt of the first on-demand request signal, (iii) upon determination that the second on-demand request signal is the redundant order attempt, generating, with the first server, first data prompting first notification indicating that a redundant order attempt has been made to the set-top box, and (iv) forgoing, with the first server, to process the second on-demand request signal.

In another variant, the method further includes steps of (i) receiving waiting order information included in the process status information from the second server, (ii) generating second data prompting second notification corresponding to the waiting order information, and (iii) transmitting, with the first server, the second data to the subscriber machine.

In another variant, the method further includes steps of (i) generating, with the second server, waiting order information included in the process status information, (ii) determining whether the waiting order information exceeds a preset maximum number of waiting orders, (iii) generating third data prompting third notification indicating that a maximum number of waiting orders is exceeded upon determination that the waiting order information exceeds the preset maximum number of waiting orders, and (iv) transmitting, with the first server, the third data to the subscriber machine.

In another variant, the method further includes steps of receiving a check request signal responsive to the third notification indicating that the waiting order is exceeded, and in response to the check request signal, transmitting, with the first server, the first on-demand request signal to the third server through the second server.

According to embodiments of the present disclosure, there is provided a media-providing system including: a media-providing server; and a data server, wherein the media-providing server transmits on-demand content related to commerce content to a set-top box, receives a first on-demand request a signal for the on-demand content from the set-top box, and transmits the first on-demand request signal to a data server, and includes a communication unit communicating with the set-top box and the data server, and a processor for overall controlling the media-providing server, and the data server generates an on-demand call request signal including a product code of the commerce content and a user code of the set-top box in response to the first on-demand request signal, transmits the on-demand call request signal to an on-demand ARS server, receives process status information on the on-demand call request signal from the on-demand ARS server, and transmits a message corresponding to the process status information to a user terminal corresponding to the first on-demand request signal.

The data server when the processing status information on the on-demand call request signal indicates that the call is unavailable, generates a message including a function of regenerating the on-demand call request signal in response to a call unavailability, and transmits the message to a user terminal corresponding to the first on-demand request signal.

The processor determines whether a second on-demand request signal is a redundant order attempt, when receiving the second on-demand request signal for the on-demand content from the set-top box, transmits guide pop-up data indicating that a redundant order attempt has been made to the set-top box, when the second on-demand request signal is the redundant order attempt, and skips processing for the second on-demand request signal.

The processor receives waiting order information included in the process status information from the data server, generates guide pop-up data corresponding to the waiting order information, and transmits the guide pop-up data to the set-top box.

The processor receives waiting order information included in the process status information from the data server; when it is detected that the waiting order information has exceeded a preset maximum number of waiting orders, generates guide pop-up data indicating that a maximum number of waiting orders has been exceeded and transmits the guide pop-up data to the set-top box; receives a check request signal for the guide pop-up data indicating that the waiting orders have been exceeded from the set-top box; and transmits the first on-demand request signal corresponding to the check request signal to the on-demand ARS server through the data server.

In another variant, the processor of the media-providing server is configured to generate a set of data prompting different user notifications corresponding to the process status information.

In further another variant, the processor of the media-providing server is configured to generate a set of data prompting different user notifications corresponding to the process status information.

In further another variant, the set of data prompting the different user notifications is output as a pop-up display on the user terminal.

In further another variant, the media-providing server is operable to receive a check request signal in response to the pop-up display from the user terminal.

According to an embodiment of the present disclosure, there is provided a computer program may be stored in a medium to execute any one of the methods according to embodiments of the present disclosure using a computer.

In addition to this, another method for implementing the present disclosure, another system, and a computer-readable recording medium for recording a computer program for executing the method are further provided.

Other aspects, features and advantages other than those described above will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
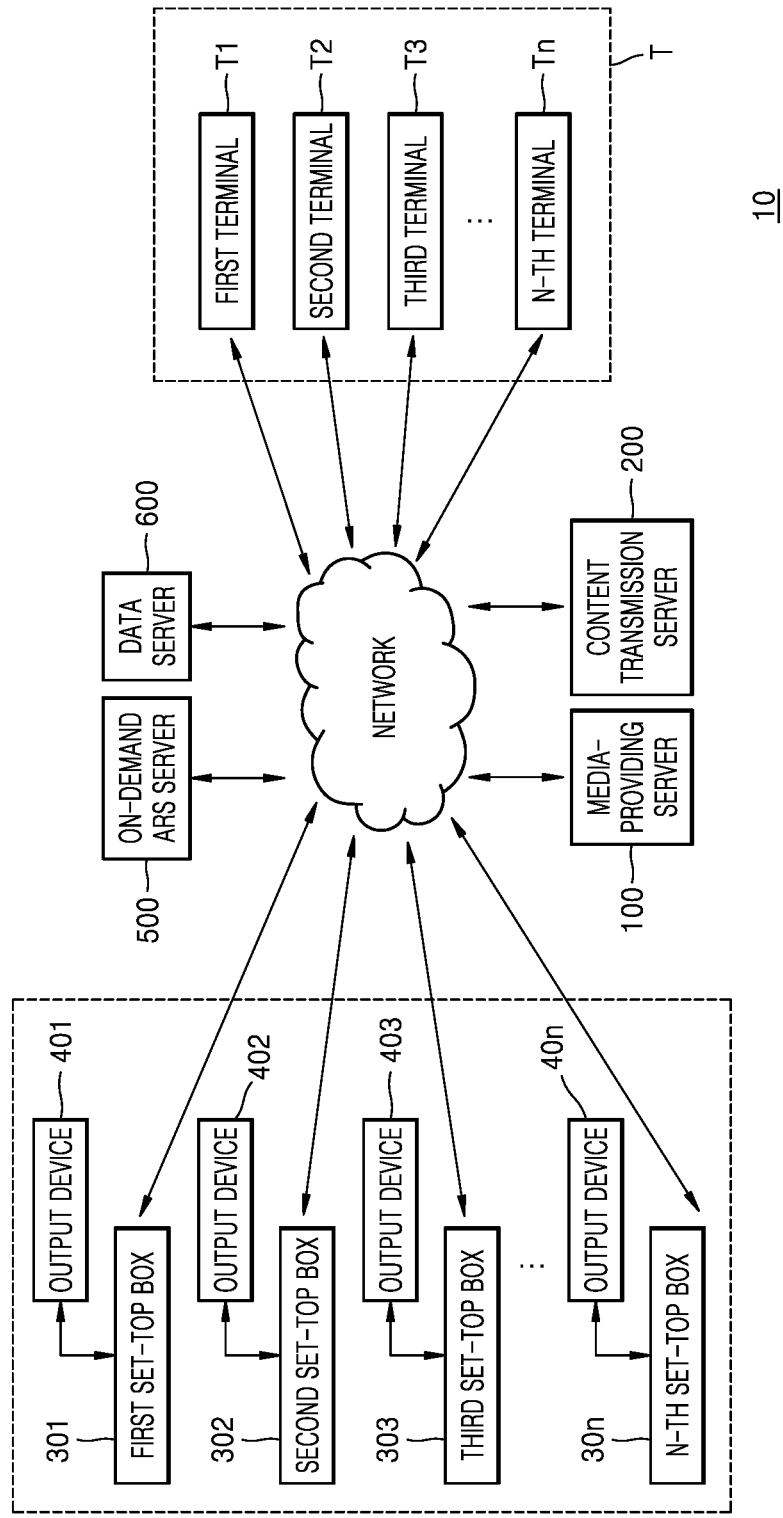
FIG. 1 is a diagram illustrating a network environment of a media-providing system 10 that transmits a broadcast video through a media-providing server according to embodiments of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a configuration and an operation of the present disclosure will be described in detail with reference to the embodiments of the present disclosure illustrated in the accompanying drawings.

Since the present disclosure can apply various transformations and can have various embodiments, and specific embodiments are illustrated in the drawings and described in detail in the detailed description. Effects and features of the present disclosure, and a method of achieving them will become apparent with reference to the embodiments described below in detail in conjunction with the drawings.

However, the present disclosure is not limited to the embodiments disclosed below and may be implemented in various forms.

Hereinafter, the embodiments of the present disclosure will be described in detail with reference to the accompanying drawings, and when the description is given with reference to the drawings, the same or corresponding components are given the same reference numerals, and the overlapping description thereof will be omitted.

In the following embodiments, terms such as first, second, and the like are used for the purpose of distinguishing one component from another, rather than limiting them.

In the following embodiments, the singular expression includes the plural expression unless the context clearly dictates otherwise.

In the following embodiments, a term such as include or have means that the features or components described in the specification exist, and the possibility of adding one or more other features or components is not excluded in advance.

In the drawings, sizes of the components may be exaggerated or reduced for convenience of description. For example, since the size and thickness of each component illustrated in the drawings are arbitrarily indicated for convenience of description, the present disclosure is not necessarily limited to the illustrated size and thickness thereof.

In a case in which certain embodiments is able to be implemented differently, a specific process sequence may be performed differently from the described sequence. For example, two processes described in succession may be performed substantially simultaneously, or may be performed in the order opposite to the order described.

In some embodiments, a set-top box is a hardware device necessary for viewing satellite broadcasting or cable broadcasting at home. Data such as satellite broadcasting, cable broadcasting, or Internet broadcasting is transmitted to the set-top box as data processed through compression and modulation, or the like, which performs demodulation and decompression processing on the received data, and plays a role that is able to be implemented in a terminal such as TV.

FIG. 1 is a diagram illustrating a network environment of a media-providing system 10 that transmits a broadcast video through a media-providing server according to embodiments of the present disclosure.

The media-providing system 10 may include a media-providing server 100, a content transmission server 200, a first set-top box 301, a second set-top box 302, a third set-top box 303, . . . , an n-th set-top box 30n, an on-demand ARS server 500, a data server 600, a first terminal T1, a second terminal T2, a third terminal T3, . . . , and an n-th terminal Tn. The media-providing system 10 may further include output devices 401, 402, 403, . . . , and 40n, (hereinafter, referred to as 400) respectively connected to the first set-top box 301, the second set-top box 302, the third set-top box 303, . . . , and the n-th set-top box 30n. At least one of the first set-top box 301, the second set-top box 302, the third set-top box 303, . . . , and the n-th set-top box 30n may be referred to as the set-top box 300. At least one of the first terminal T1, the second terminal T2, the third terminal T3, . . . , and the n-th terminals Tn may be referred to as the terminal T.

In the media-providing system 10, the media-providing server 100, the content transmission server 200, the set-top box 300, the on-demand ARS server 500, the data server 600, and the terminal T may communicate with each other through a network. The communication method of the network of the present disclosure includes wired or wireless communication but is not limited thereto, and the network according to some embodiments may use short-range wireless communication. In the media-providing system 10, the set-top box 300 and the output device 400 may be connected through a network or an electric line. In addition, the set-top box 300 and the output device 400 may be implemented as one piece of hardware. The media-providing system 10 may further include a remote control device (for example, a remote controller) for communicating with the set-top box 300 and/or the output device 400. The set-top box 300 or the output device 400 may communicate with the remote controller through a local area network.

The set-top box 300 may be installed in a designated space, such as a home, to provide a broadcasting service, and the set-top box 300 may provide a broadcasting service such as a shopping broadcasting service through a commerce channel.

The set-top box 300 may communicate with the media-providing server 100 and the content transmission server 200 through a network. The set-top box 300 may transmit data to the output device 500 based on the data received from the media-providing server 100 and the content transmission server 200. The output device 400 includes a TV, a smart TV, and the like, and may include any type of electronic device including a display, such as a smart phone or a PMP.

The set-top box 300 may transmit a user input from a separate input device or the output device 400 to the media-providing server 100.

The media-providing system 10 may generate output data for broadcasting through the media-providing server 100, and transmit the output data for broadcasting from the media-providing server 100 to the set-top box 300. The media-providing server 100 may transmit the output data for broadcasting to the set-top box 300 using a cloud service.

The media-providing server 100 may transmit content information corresponding to the output data to the set-top box 300. The media-providing server 100 may drive an application stored in the cloud server, stream and display the application on the output device 400 of each user.

The media-providing server 100 may generate the output data for broadcasting based on the data received from a data server 600. In some embodiments, the media-providing server 100 may output a preset pop-up screen corresponding to a broadcast video and a broadcast schedule. The media-providing server 100 may obtain information on the broadcast video to be output from the data server 600 and generate the output data for broadcasting including video identification information on the obtained broadcast video. The media-providing server 100 may generate the output data including the video identification information on the broadcast video and the user interface. The media-providing server 100 may perform a function of generating the user interface using data stored in the data server 600. The media-providing server 100 may receive data necessary for generating the output data for broadcasting from the external data server 600. The media-providing server 100 may receive product information, customer information, order information, schedule information, and the like from the data server 600. The media-providing server 100 may transmit and process a request signal from the set-top box 300 to the data server 600.

When receiving an on-demand request signal from the set-top box 300, the media-providing server 100 may transmit it to the on-demand ARS server 500 so that an order call corresponding to the received on-demand request signal is performed. In detail, the on-demand request signal may include time stamp information on an order request time, product information, and user information (for example, a registered user phone number). The media-providing server 100 may transmit the on-demand request signal to the on-demand ARS server 500 through the data server 600.

When receiving the on-demand call request signal from the media-providing server 100 or the data server 600, the on-demand ARS server 500 may perform an order call connection to the user corresponding to the received on-demand call request signal. At this time, the call connection may be automatically performed through an order call line system included in the on-demand ARS server 500, but it is not limited thereto.

According to an optional embodiment, the on-demand ARS server 500 may proceed not only with the on-demand call request signal but also with a user's order process based on additional information. For example, the on-demand ARS server 500 may identify a video the user is watching at a time when a user input is received based on information (for example, set-top box information, media information, and layer information) included in the first content information and the second content information.

According to the above-described embodiment, the on-demand ARS server 500 enables a user to proceed an order, without additional input from a user, by identifying the video and various information that the user is watching when the user performs the order.

Meanwhile, the media-providing server 100 may control the set-top box 300 through a program installed in the set-top box 300. The media-providing server 100 may perform a function of reading information of the set-top box 300. The media-providing server 100 may receive a platform code, an STP ID, access information, and the like of the set-top box 300. The media-providing server 100 may generate the output data of the set-top box 300 based on the information on the set-top box 300. The media-providing server 100 may regenerate the output data for broadcasting corresponding to the user input obtained through the set-top box 300 and transmit it to the set-top box 300.

The media-providing server 100 may display captured information of various contents on a screen of the output device 500 through the set-top box 300 instead of the information itself including these various contents such as an operation through a cloud solution. The media-providing server 100 may be implemented by using the cloud server and control conversion of one or more first and second cloud servers. The media-providing server 100 may implement a screen in the output device 500 through application driving corresponding to a selected channel through the first cloud server, and accommodate a plurality of users therethrough.

The set-top box 300 may communicate with the media-providing server 100 to receive the output data, interpret and read (encode, or the like) the received output data, and output it through the output device 500 such as TV. The set-top box 300 may output the output data for broadcasting received from the media-providing server 100 through the output device 500. The set-top box 300 may obtain the user input through a provided input device and transmit a request signal corresponding to the user input to the media-providing server 100.

The content transmission server 200 performs a function of transmitting broadcast videos of one or more broadcasters or broadcasting channels to the set-top boxes 300. The content transmission server 200 may be implemented to broadcast and transmit the content received from the content providing server.

The data server 600 may store and manage information on generating data for broadcasting output. The data server 600 is a computing device in which server programs such as Apache Tomcat® and Oracle are installed, and may be implemented to process a server function. The data server 600 may store product information, production information, and/or review information of the content as described above. In addition, the data server 600 may store video identification information, pop-up data, and the like, and provide related information to the media-providing server 100 corresponding to a request from the media-providing server 100.

The user terminal T according to an embodiment of the present disclosure may be an electronic device corresponding to information input by the user of the set-top box 300 and the output device 400. The user terminal T may be implemented as a portable device such as a smart phone, but is not limited thereto, and may be implemented as various types of devices having a display function, such as a PC, a tablet PC, a PMP, and a PDA.

The media-providing system 10 according to the embodiment of the present disclosure may further include a content providing server. The content providing server may register (for example, obtain and store) content such as a commerce moving video to be provided. In addition, the content providing server may receive meta information of content such as a moving video from the data server 400 and match the meta information on each content. To this end, the content providing server may be connected to the data server 400 and exchange various information with each other through communication.

The content providing server may convert content such as a registered moving video depending on a platform or a format of each broadcaster and transmit the converted content to the content transmission server 200. Of course, the present disclosure is not limited thereto and the content providing server may store the content and transmit it to the content transmission server 200, and the content transmission server 200 may convert and store the content depending on the platform or the format of the broadcaster. This is the same in the embodiments and modifications thereof to be described later.

Meanwhile, the content providing server may obtain the meta information of the content from the data server 400. The meta information may include product information, production information, and/or review information related to the corresponding content. Of course, in some cases, the content providing server may directly receive and store the meta information from the content provider.

The content providing server may transmit data of the content such as the moving video or data of converted content to the content transmission server 200 through a distributed network (CDN). Also, the content providing server may receive video identification information of each moving video from the content transmission server 200. The video identification information may be, for example, regeneration URL information stored in the content transmission server 200.

Figure 2:
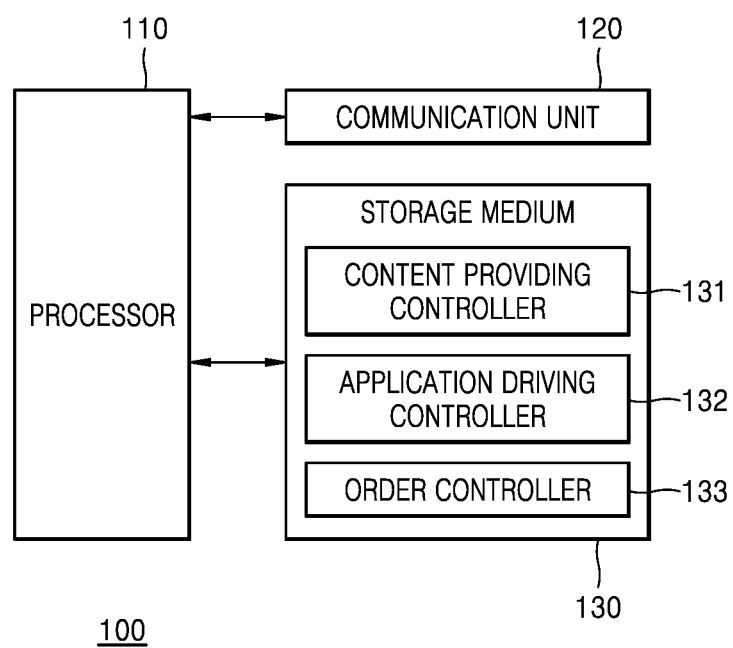
FIG. 2 is a block diagram of a media-providing server according to embodiments of the present disclosure.

FIG. 2 is a block diagram of a media-providing server 100 according to embodiments of the present disclosure.

A processor 110 has a configuration for overall controlling the media-providing server 100. In detail, the processor 110 controls overall operations of the media-providing server 100 by using various programs stored in a storage medium 130 of the media-providing server 100. For example, the processor 110 may include a CPU, a RAM, a ROM, and a system bus. Here, the ROM has a configuration in which an instruction set for system booting is stored, and the CPU copies a stored operating system of the media-providing server 100 to the RAM depending on instructions stored in the ROM, and executes an O/S to boot the system. When booting is complete, the CPU may copy various stored applications to RAM and perform various operations. Although it is described above that the media-providing server 100 includes only one CPU, it may be implemented with a plurality of CPUs (or DSPs, SoCs, or the like).

According to an embodiment of the present disclosure, the processor 110 may be implemented as a digital signal processor (DSP), a microprocessor, or a time controller (TCON) for processing a digital signal. However, the present disclosure is not limited thereto, and may include one or more of a central processing unit (CPU), a micro controller (MCU), a micro processing unit (MPU), a controller, an application processor (AP), a communication processor (CP), and an ARM processor, or may be defined by corresponding terms. In addition, the processor 110 may be implemented as a system on chip (SoC), large scale integration (LSI), or a field programmable gate array (FPGA) having a built-in processing algorithm.

A communication unit 120 is configured to transmit and receive data to and from a device such as the content transmission server 200, the set-top box 300, the data server 600, or the user terminal T. The communication unit 120 may include a short-distance communication unit, a mobile communication network, or a wired Ethernet network, wherein the short-distance communication unit may include a Bluetooth® communication unit, a bluetooth low energy (BLE) communication unit, a near field communication unit, a WLAN (Wi-Fi) communication unit, a zigbee communication unit, an infrared (IrDA, infrared data association) communication unit, a wi-fi direct (WFD) communication unit, an ultra wideband (UWB) communication unit an Ant+ communication unit, and the like.

The media-providing server 100 may further include the storage medium 130 storing various data for overall operations, such as a program for processing or controlling the processor 110. In detail, the storage medium 130 may store a plurality of application programs or applications driven in the media-providing server 100, data for the operation of the media-providing server 100, and instructions. At least some of these application programs may be downloaded from an external server through wireless communication. Also, at least some of these application programs may exist on the media-providing server 100 from a time of shipment for a basic function of the media-providing server 100. The application program may be stored in a storage medium and driven to perform an operation (or function) of the media-providing server 100 by the processor 110.

The storage medium 130 may include a content providing controller 131, an application driving controller 132, and an order controller 133.

The content providing controller 131 may perform control to display content corresponding to a displayed channel of the output device 400 depending on a user's control. For example, when the user inputs a channel selection input through the remote controller while watching TV, the selection input may be recognized, and a content video related to a channel corresponding to the selection input may be displayed on the user's TV.

According to an embodiment of the present disclosure, when the content providing controller 131 selects and inputs a channel corresponding to the channel video signal received from the content transmission server 200, the content related to the selected channel may be controlled to be displayed together with to the output device 400.

The application driving controller 132 may control the output device 400 to drive an application including one or more regions distinguished from the channel video on the output device 400.

As an optional embodiment, when a video set in a channel corresponding to the selection input is displayed on the output device 400 through the application driving controller 132, the operation may be performed simultaneously. As a specific example, the application may start driving at the same time when the video set in the channel is displayed on the output device 400.

In addition, as an example, until a channel set depending on the user's selection input is changed, information such as an image or a moving video displayed on the output device 400 may be controlled through the application driving controller 132. As a specific example, the application driving controller 132 may control the screen of the output device 400 through the control of applications including the broadcast video, the commerce content, and the like through signal connection with the set-top box 300 connected to the output device 400.

An application driven in the output device 400 through the application driving controller 132 may include various interface information and output information, for example, may include a menu bar type that responses to the user's selection input.

In addition, as an example, the application driven in the output device 400 through the application driving controller 132 may control the display of a frame in a form of an image fixed for a predetermined time in a form of an image on the TV.

In addition, as an example, the application driven in the output device 400 through the application driving controller 132 may perform the control to display one or more moving videos information on the screen of the output device 400, and as a specific example, may control the set-top box 300 to display the moving video information. As an optional embodiment, when implementing such a moving video, the application driving controller 132 may control a location where the moving video is to be implemented among the overall screen area, and as an additional example, may control whether it will be implemented anywhere in the frame area displayed as an application on the screen of the output device 400.

As an example of the operation, when receiving a signal for implementing the moving video through the application driving controller 132, the set-top box 300 may select the moving video corresponding to the signal from stored video information or select address information of the moving video to display on the screen of the output device 400. At this time, the selected moving video information may be displayed in the received position or frame area.

Through these operations, until the channel set based on the user's selection input is changed, one or more moving images may be implemented on the TV through the application driving controller 120 by recognizing an input by the user in an input area, for example, a menu bar or various selection buttons through an application displayed on the output device 400. For example, a plurality of moving videos may be sequentially implemented or a change of the moving video, and start or end of a new moving video may be easily proceeded based on the user's selection.

The moving video information may include various information and may include shopping information. For example, one piece of moving video information may include one piece of shopping deal information. As an optional embodiment, such moving video information may include TV home shopping moving video information each including one item.

Therefore, the user may easily check a plurality of moving video information, specifically the shopping deal information, without changing the channel by selecting a channel on the screen of the output device 400, and an effect that the use may easily view home shopping channel information of the plurality of output devices 400 may be implemented.

As an optional embodiment, while checking the video information transmitted through a broadcasting center via the screen of the output device 400, at the same time, various information on the image information, for example, home shopping information, may be checked through an application implemented on the screen of the output device 400. As a specific example, by simultaneously displaying data information corresponding to the image information transmitted as data in the form of an application on the screen of the output device 400 while checking the image information, a user's convenience and a user's ordering convenience may be improved.

In addition, while checking the video information transmitted through the broadcasting center, through a user's manipulation, for example, a direction manipulation of a remote controller or a user's input of various selection buttons, the application driving controller 132 may selectively display various kinds of video information that has already been produced, for example, shopping deal video information, on the output device 400.

As an optional embodiment, the application driving controller 132 may include a cloud control connection unit. Therefore, the application driving screen may be easily displayed on the screen of the output device 400 of the user by a cloud method, as a specific example, a method such as a cloud streaming method.

For example, the application driving controller 132 may include a media cloud server, and through this media cloud server, the application may be implemented on the screen of the output device 400 as necessary, and as a specific example, may be transmitted to the set-top box 300 by being connected to the set-top box 300.

Therefore, a degree to which an application and data and software necessary for driving the application are included in the set-top box 300 or the output device 400 may be reduced or eliminated.

In addition, when the application is implemented by using the cloud server, as an optional embodiment, the application may be implemented by driving the preliminary cloud server, or the application may be implemented by driving the main cloud server. When the user selects a channel and video display is started through the selected channel, a preliminary cloud server may be driven, and when there is a user's manipulation, for example, moving a focus or a cursor on a screen, or a manipulation input of a remote control, the main cloud server may be driven.

When the application is driven through the preliminary cloud server operation, the same information may be displayed to a plurality of users, for example, thousands of users, who have accessed the channel. In this case, essential information corresponding to the video information, for example, data of real-time information corresponding to video information such as the number of real-time sales and a broadcasting progress rate, pop-up data information, banner information linked to the moving video, or the like may be expressed. The preliminary cloud server may have various types and may have a form of Broadcasting Cloud Streaming (BCS).

When the main cloud server is driven in a case in which there is a user operation or selection, each information according to each user's operation may be displayed. The main cloud server may have various types and may have a form of Interactive Cloud Streaming (ICS), and one user may correspond to each window (application) displayed on the cloud server.

By using the selected cloud, the efficiency of the cloud server is improved and a load on the cloud server is reduced, so that it is possible to smoothly drive complex applications even when multiple users use the channel at the same time.

In addition, cloud server management efficiency may be improved by allocating a minimum number of cloud servers to users who do not stay for a long time after selecting a channel or change a channel after not selecting a channel.

The order controller 133 may be configured to control a user's order operation with respect to information displayed through the output device 400.

With respect to the set video corresponding to the channel or one or more additionally displayed moving videos, the order controller 133 may recognize a user's selection, for example, a user's input through driving an application, and may control the order operation by recognizing the input.

The broadcast video or one or more moving videos set as described above may include the shopping deal information, and each of the shopping deal information has corresponding source information. This source information is stored in a specific server or a storage unit, and may be connected to the application driving controller 132, real time or periodically.

When the user selects, for example, inputs the on-demand order to purchase a product included in the moving video, the order controller 133 may recognize this. Such recognition may be proceeded through various UIs such as an order selection button displayed on the output device 400, and such display and recognition may be proceeded through the application driving controller 132.

When this input proceeds, the order controller 133 may use the source information corresponding to the shopping deal that the user has selected to order, identify accurate item information that the user wants to order, and initiate an order operation.

The order controller 133 may control the connection with the on-demand ARS server 500. The connection to the on-demand ARS server 500 may be performed through the data server 600.

In a case of an already registered user, as a specific example, the user has already registered as a member or a phone number is registered, the on-demand request signal is generated by matching with the ID information of the set-top box 300 and the on-demand request signal may be transmitted to the on-demand ARS server 500. If the user who is not a member or a phone number is not registered, the order controller 133 may transmit an input interface for inputting a phone number to the set-top box 300. In a case in which the user's phone number information is received through the input interface, the phone number information may be transmitted to the on-demand ARS server 500 to process the on-demand request signal.

In addition, the order controller 133 may receive an on-demand request signal for receiving an ARS asking price to the user terminal T from the set-top box 300. In this case, the order controller 133 receives a product code and a user code corresponding to the on-demand request signal from the data server 600, and based on the user's identification information such as the user code and product identification information such as the product code, it is possible to generate an on-demand call request signal. The product identification information may be obtained based on the video identification information of the commerce content to which the on-demand request signal is input. The user's identification information may be obtained as user information input corresponding to the identification information of the set-top box in which the order is input.

In addition, the order controller 133 may transmit the on-demand request signal to the data server 600 through the data server 600 to the on-demand ARS server 500. In this case, the data server 600 inquires the user code and the product code corresponding to the on-demand request signal, and generates the on-demand call request signal based on the user code that is the user's identification information and the product code that is the identification information of the product. The on-demand call request signal may be transmitted to the on-demand ARS server 500.

When receiving the on-demand call request signal, the on-demand ARS server 500 may process a corresponding order process by executing the call connection to the user terminal T of the user who inputs the order through set-top box 300 or other devices. The on-demand ARS server 500 identifies the user terminal T of the user who inputs the order through set-top box 300 based on the identification information of the user and the identification information of the product included in the on-demand call request signal, and requests the order call connection to the user terminal T. The on-demand ARS server 500 may obtain the user's order information, payment information, delivery information, and the like, from the user terminal T through the order call connection. The on-demand ARS server 500 may transmit the order information, the payment information, and delivery information, which are processing results of the on-demand call, to the seller terminal.

The on-demand ARS server 500 may transmit process status information of the order call connection with the user terminal T to the media-providing server 100 or the data server 600 in relation to the order call connection. The process status information of the order call connection is status information on the order call connection to the user terminal T. The process status information may further include whether the order call connection is normally terminated or abnormally terminated, or the like, and may include whether the normal processing of the order call connection, whether the call failure of the order call connection, whether the midway cancellation of the order call connection, or the like. The on-demand ARS server 500 may include the abnormally terminated order call connection in the waiting order information.

Additionally, in a case in which the on-demand ARS server 500 receives an on-demand call request signal exceeding a predetermined maximum call connection line, it may generate and manage the waiting order information on the order call connection. The on-demand ARS server 500 may transmit the waiting order information on the order call connection to the media-providing server 100 or the data server 600 to share whether to process, whether to wait, or the like. Here, the waiting order information is for the order call connection for one or more products, and may include the number of waited order call connections without the order call connection when exceeding a preset maximum call connection line. For example, if hundred (100) on-demand call request signals are received, of which order call connections for eighty (80) on-demand call request signals are processed, and twenty (20) request signals are being processed or waited, the number of waiting orders may be twenty (20). The number of waiting orders may be implemented so as not to exceed the maximum number of waiting orders.

The data server 600 that has received the processing status information from the on-demand ARS server 500, when the processing status information indicates that the requested order call connection is unavailable or canceled midway, may transmit a message including a function of regenerating the on-demand call request signal to user terminal (T) of the corresponding order call connection. Such a message may be transmitted from the on-demand ARS server 500 to the user terminal T, or may be transmitted from the media-providing server 100 that receives the process status information, but it is not limited thereto. The message may be transmitted from various electronic devices that receive the process status information.

The data server 600 may transmit the process status information received from the on-demand ARS server 500 to the media-providing server 100. The media-providing server 100 may generate the guide pop-up data of the on-demand request signal based on the process status information and transmit the guide pop-up data to the set-top box 300. The guide pop-up data of the on-demand request signal may include a notification that the order call connection is being attempted, a notification of a waiting number of persons, a notification of exceeding of the maximum number of waiting orders, or the like. Optionally, in a state in which the process status information is not received, the media-providing server 100 may generate the guide pop-up data of the on-demand request signal based on the previously received waiting person information, or the like, and transmit the guide pop-up data to the set-top box 300.

In a case in which the on-demand request signals for one product are redundantly received from one set-top box 300, the media-providing server 100 may prevent the on-demand request signals from being redundantly processed. In a case in which a first on-demand request signal is received from the set-top box 300 and a second on-demand request signal is received again, the media-providing server 100 may determine whether the second demand request signal is redundant based on data for the on-demand request signals being processed, and may not process the redundant second on-demand request signal. At this time, whether the second on-demand request signal is redundant can be determined based on whether the identification information of the set-top box 300 and the identification information of the commerce content at the time the request signal is received, match the information of the on-demand request signal that has already been applied. In addition, when receiving the first on-demand request signal from the first set-top box 301 and receiving again the second on-demand request signal from the first set-top box 301 within a preset order call connection processing time, the media-providing server 100 determines that the second on-demand request signal is redundant, and the second on-demand request signal is not processed.

Figure 13:
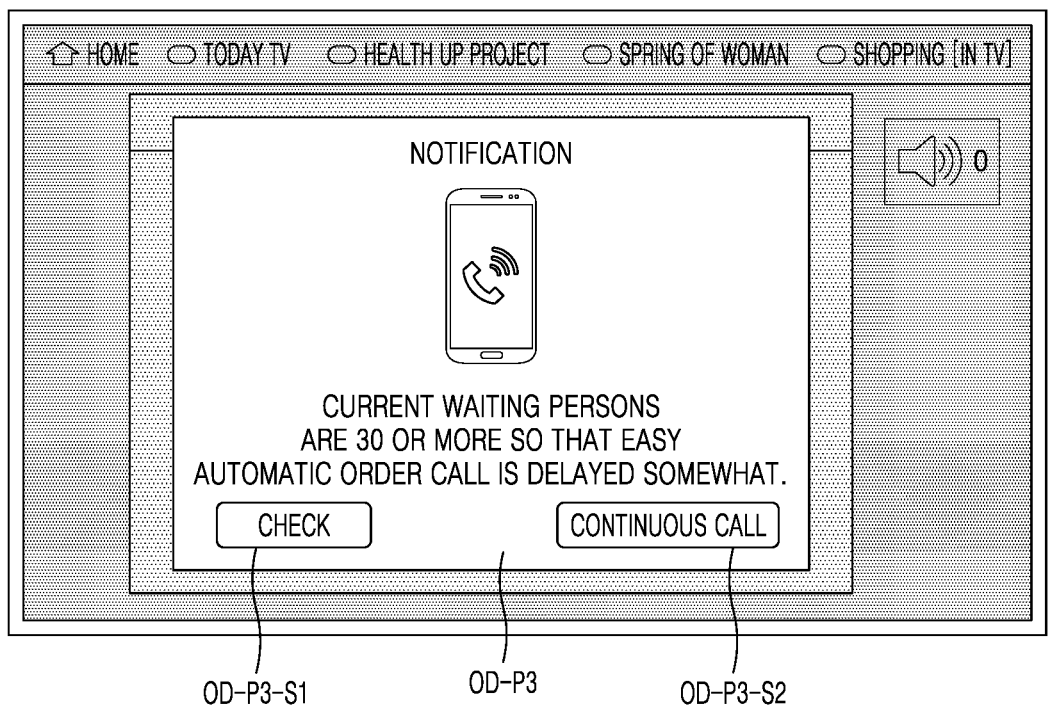
FIG. 13 illustrates an embodiment of displaying a notification that other media orders be output according to an embodiment of the present disclosure.

The media-providing server 100 may generate a notification that a maximum number of waiting orders is exceeded based on at least one of the process status information and the waiting order information as guide pop-up data and transmit it to the set-top box 300. Where the maximum number of waiting orders is exceeded, the corresponding on-demand request signal is not processed and may not be stored in a stack list of the on-demand ARS server 500. The present disclosure is not limited thereto, and the corresponding on-demand request signal may be stored in a separate storage space. In another embodiment, the guide pop-up data may include a functional area for moving to an order page through another medium. As illustrated in FIG. 13, the guide pop-up data OD-P3 may include a first functional area OD-P3-S1 which provides functional areas that move to a remote controller easy order or a mobile order which is another medium, and a second functional area OD-P3-S2 which provides output data ODAA (see FIG. 8) including an easy automatic order, a mobile order, and a remote controller order.

In addition, the media-providing server 100 may generate guide pop-up data including a notification that the order call connection is being attempted, a notification that the order call connection is abnormally processed, a notification that the order call connection is waiting, or the like, and transmit it to the set-top box 300. The guide pop-up data may include an input area for canceling the order call connection, and receive an input for canceling the order call connection from the set-top box 300.

Figure 3:
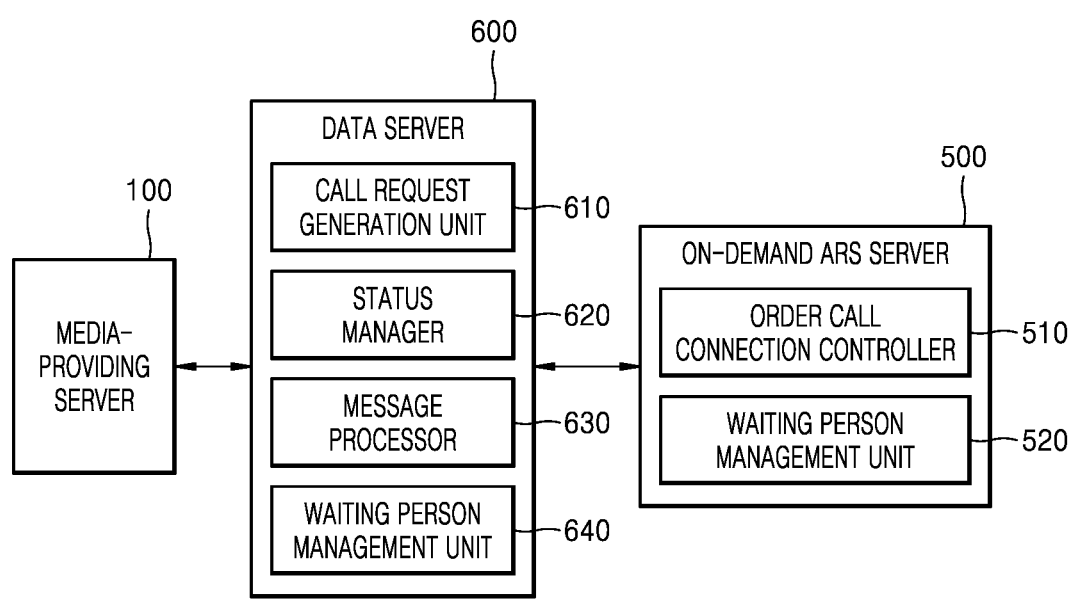
FIG. 3 is a diagram illustrating data transmission/reception between the media-providing server of FIG. 2, an on-demand ARS server, and a data server, according to an embodiment of the present disclosure.

FIG. 3 is a diagram for explaining data transmission/reception between the media-providing server 100, the on-demand ARS server 500, and the data server 600 according to an embodiment of the present disclosure.

A call request generation unit 610 of the data server 600 may receive the on-demand request signal from the media-providing server 100 and generate a call request signal corresponding to the on-demand request signal. The data server 600 may search for information related to an order product and information on a user system who is an ordered system required for the order call connection based on the identification information of the set-top box or the identification information of the commerce content included in the on-demand request signal, to generate the on-demand call request signal. The retrieved information may be transmitted to the media-providing server 100 and the on-demand call request signal may be generated in the media-providing server 100.

A status manager 620 may receive the process status information on the on-demand call request signal from the on-demand ARS server 500. The status manager 620 may store process status information on on-demand request signals and separately manage abnormally processed or terminated on-demand request signals. The status manager 620 may retransmit the abnormally processed or terminated on-demand request signals to the on-demand ARS server 500 while managing the process status information, or handle a process of transmitting a message having a function of regenerating the on-demand call request signal to the user terminal.

A message processor 630 may transmit a message for generating the on-demand call request signal to the user terminal T in consideration of the process status information on the on-demand call request signal. When the process status information received from the on-demand ARS server 500 is abnormally terminated, call-failed, midway-cancelled, or the like, a message including a function of generating the on-demand call request signal may be transmitted to the user terminal T of the user. When a reply signal to the corresponding message is received, a call request generator 610 may generate the on-demand call request signal and transmit it to the on-demand ARS server 500.

A waiting person management unit 640 may receive the waiting order information while transmitting the on-demand call request signal to the on-demand ARS server 500. The waiting order information may be periodically received and monitored.

The order call connection controller 510 of the on-demand ARS server 500 receives the on-demand call request signal and tries to connect the order call to the user terminal T based on the identification information included in the on-demand call request signal. The order call connection may be attempted up to a maximum number of call connection lines. If the maximum number of connection lines is exceeded, the on-demand call request signal may be stored as waiting order information.

The order call connection controller 510 of the on-demand ARS server 500 attempts to connect the order call in chronological order among the on-demand call request signals stored in the waiting order information. After the order call is connected, the corresponding on-demand call request signal is removed from the waiting order information.

The waiting person management unit 520 may store the waiting order information by using a data structure corresponding to the maximum number of waiting orders. Each structure of the waiting order information has a structure capable of storing the on-demand call request signal. The waiting order information may further include information on the number of currently waiting orders. The on-demand ARS server 500 may transmit the number of waiting orders among the waiting order information to the media-providing server 100 or the data server 600.

Figure 4:
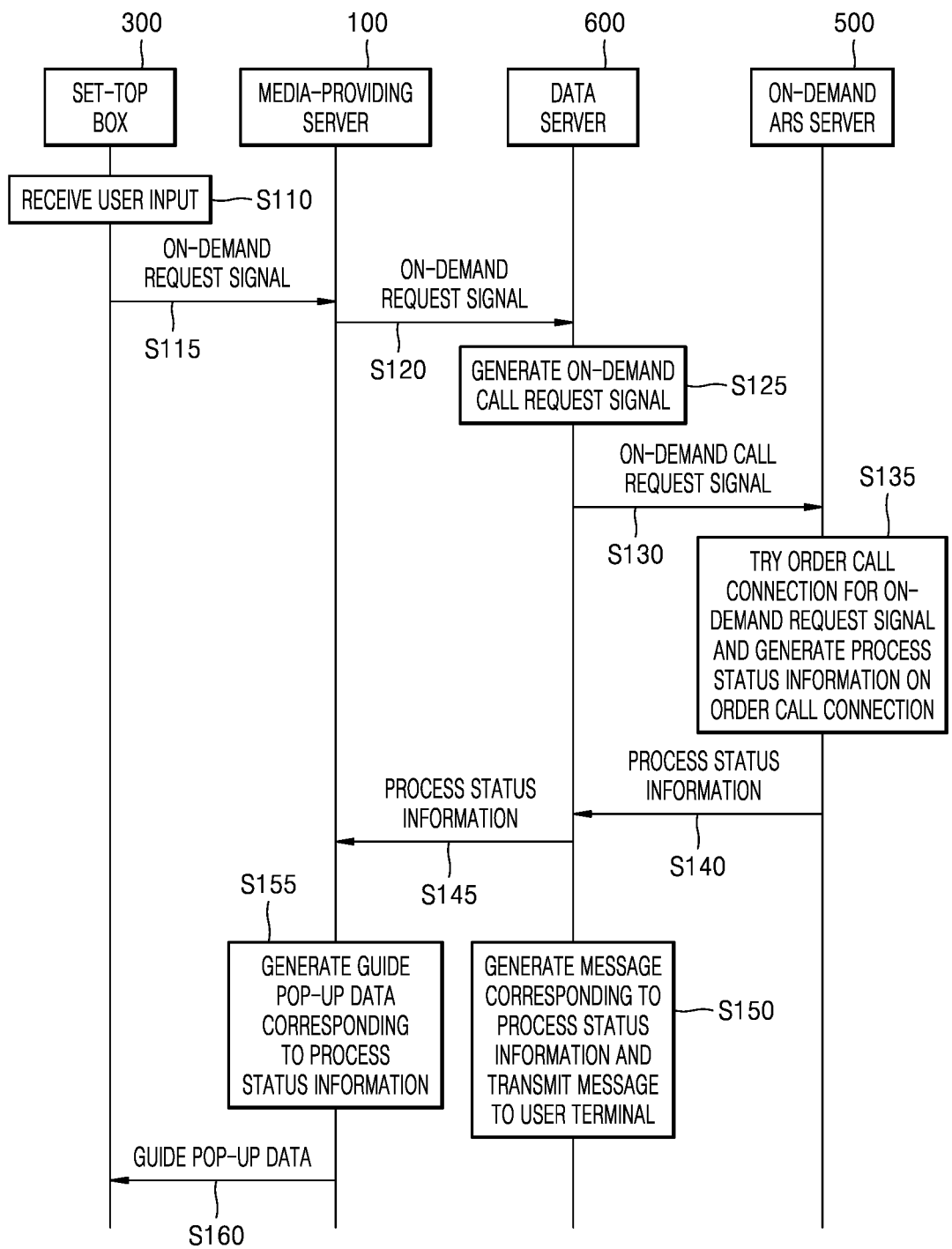
FIG. 4 is a flowchart of a method of processing an on-demand request for the commerce content according to an embodiment of the present disclosure.

FIG. 4 is a flowchart of a method of processing an on-demand request for commerce content according to an embodiment of the present disclosure.

In process S110, the set-top box 300 obtains the user input for requesting the on-demand order and transmits the on-demand request signal including the identification information of the set-top box and the video identification information of the commerce content to the media-providing server 100 (S115).

In process S120, the media-providing server 100 transmits the on-demand request signal including the identification information of the set-top box and/or the video identification information on the corresponding commerce content to the data server 600. The on-demand request signal may include the identification information of the set-top box and the identification information of the user. Even with one set-top box, the information on the user who makes the order may be further included. In process S125, the data server 600 may generate the on-demand call request signal based on the data included in the on-demand request signal, pre-stored product data, and the user data. The on-demand call request signal may include identification information (phone number, IP address, or the like) of the user terminal for making an order call connection to the user terminal, information (product code, product name, manufacturer, or the like) related to the product to be ordered, discount-related information (discount information at the time of access, discount information according to a user's grade, or the like) included in the product order, or the like. In another embodiment, the on-demand call request may be generated in the data server 600, but the on-demand call request may be generated in the media-providing server 100 and transmitted to the on-demand ARS server 500.

In process S130, the data server 600 transmits the on-demand call request signal to the on-demand ARS server 500, and the on-demand ARS server 500 processes the order call connection corresponding to the on-demand request signal (S135). The on-demand ARS server 500 generates the process status information on the order call connection. Because the process status information is the same as the description of FIG. 2, thereby being omitted.

In another embodiment, the on-demand ARS server 500 may receive the on-demand call request signal from the media-providing server 100 or receive the on-demand call request signal from the set-top box 300.

In processes S140, the on-demand ARS server 500 may transmit the process status information to the data server 600, and the data server 600 may transmit the process status information to the media-providing server 100 (S145). In another embodiment, the on-demand ARS server 500 may transmit the process status information to the set-top box 300 that transmits the on-demand call request signal or the media-providing server 100.

In process S150, the data server 600 may generate a message corresponding to the process status information and transmit the message to the user terminal T of the on-demand call request signal. In detail, in a case in which the order call is not normally processed, call-failed, midway-cancelled, the data server 600 may transmit a message including the order call connection function to the user terminal T.

In process S155, the media-providing server 100 may generate the guide pop-up data corresponding to the process status information. For example, the guide pop-up data may include a notification that the on-demand call is normally processed in a case of being normally processed, a notification that the on-demand call is waiting in a case in which the order call is on hold, a notifications that it can no longer be processed because of exceeding the maximum number of waiting orders, or the like.

The media-providing server 100 may transmit the guide pop-up data to the set-top box 300 that generates the on-demand request signal regardless of the process status information. The media-providing server 100 may generate guide pop-up data indicating that the order call is trying to connect in consideration of the processing time of the order call, and transmit it to the set-top box 300. That is, it may be implemented such that the guide pop-up data indicating that the call connection is being attempted is output for a preset order call processing time in the set-top box 300 where the order is input.

In process S160, the media-providing server 100 may transmit the generated guide pop-up data to the set-top box 300.

As described above, the media-providing server 100 may request the order call connection to the user terminal T of the on-demand request signal corresponding to the on-demand request signal from the set-top box 300. The user makes the on-demand request using the ordering function of the set-top box 300 provided during commerce viewing and receives the order call corresponding to the request to the user terminal T. The user does not need to try a separate call connection to order the product sold in the commerce. Here, the commerce may fit the broadcasting schedule list, but it is not limited thereto. The commerce may be broadcasted in the past or provided through a banner without being broadcasted.

Figure 5:
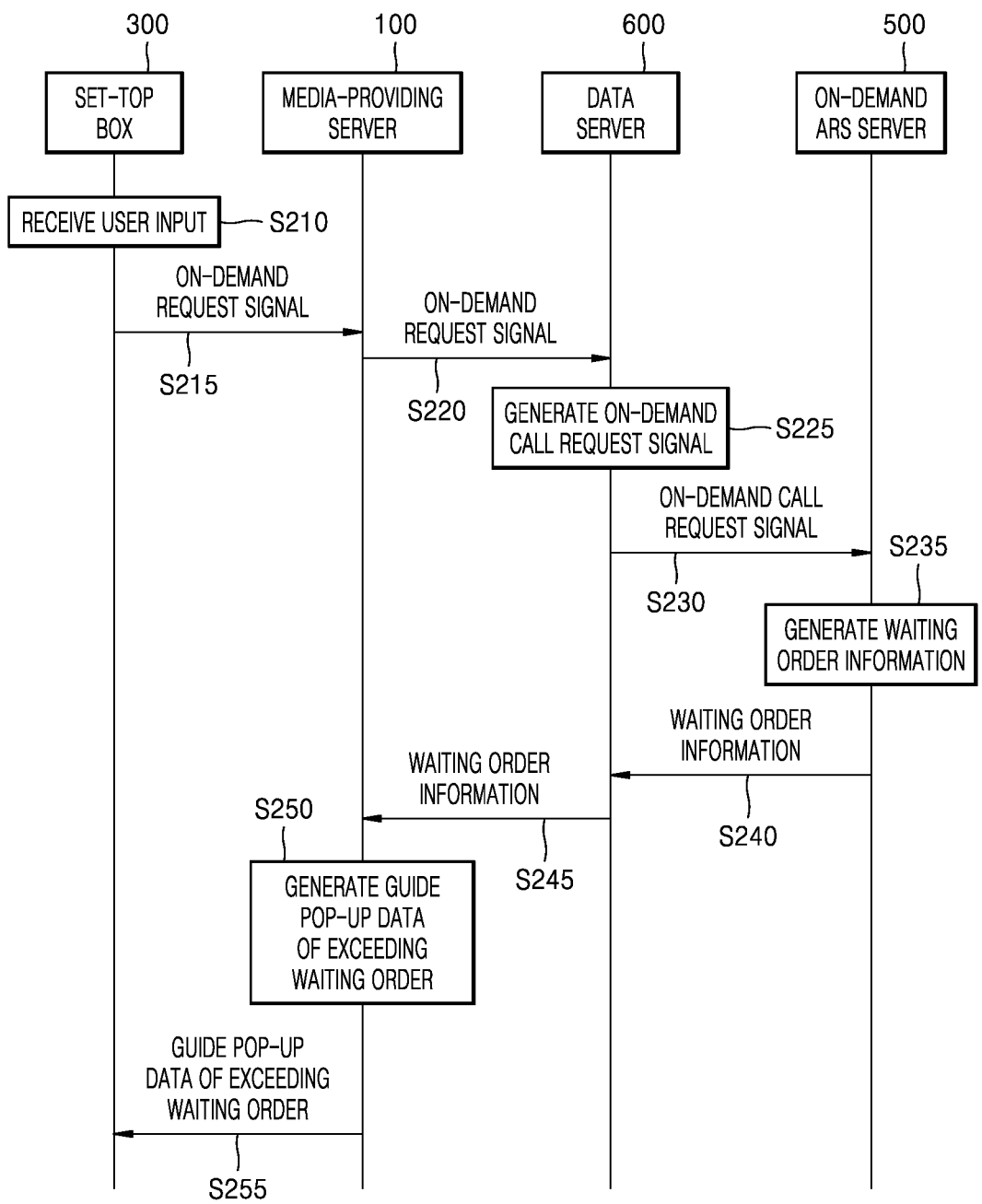
FIG. 5 is a flowchart of a method of processing waiting order calls that exceeds the preset maximum number of waiting orders according to an embodiment of the present disclosure.

FIG. 5 is a flowchart of a method of processing waiting order calls that exceeds a preset maximum number of waiting orders according to an embodiment of the present disclosure.

As illustrated in FIG. 5, in process S210, the set-top box 300 obtains the user input for requesting the on-demand order, and transmits, to the media-providing server 100, the on-demand request signal including the identification information of the set-top box and the video identification information of commerce content (S215).

In process S220, the media-providing server 100 transmits, to the data server 600, the on-demand request signal including the identification information of the set-top box and the video identification information on the corresponding commerce content. The data server 600 may generate the on-demand call request signal based on the data included in the on-demand request signal, pre-stored product data, and user data (S225). The on-demand call request signal may include the identification information (phone number, IP address, or the like) of the user terminal for making the order call connection to the user terminal, and the information related to the product to be ordered. In another embodiment, the on-demand call request may be generated in the data server 600, and may be generated in the media-providing server 100 and transmitted to the on-demand ARS server 500.

In process S230, the data server 600 transmits the on-demand call request signal to the on-demand ARS server 500, and the on-demand ARS server 500 processes the order call connection corresponding to the on-demand request signal. In another embodiment, the on-demand ARS server 500 may receive the on-demand call request signal from the media-providing server 100 or receive the on-demand call request signal from the set-top box 300.

In S235, the on-demand ARS server 500 may generate current waiting order information corresponding to the on-demand request signal. The waiting order information is for the order call connection for one or more products, and may include the number of orders waiting without the order call connection when it exceeds the preset maximum call connection lines. In a case in which the number of waiting order calls exceeds the preset maximum number of waiting orders, the on-demand ARS server 500 may not process the order call even if an additional on-demand call request signal is received.

In process S240, the on-demand ARS server 500 may transmit the waiting order information to the data server 600, and the data server 600 may transmit the waiting order information to the media-providing server 100 (S245).

In process S250, the media-providing server 100 determines whether the number of waiting order calls included in the waiting order information exceeds the maximum number of waiting orders, and in a case of exceeding the maximum number of waiting orders, generates the guide pop-up data of excess waiting order, and transmits the guide pop-up data of the excess waiting order to the set-top box 300 (S255).

As described above, the media-providing server 100 may provide information that the on-demand request signals from the set-top box 300 are waiting, so that the user can be immediately informed that the order call connection is delayed.

Figure 6:
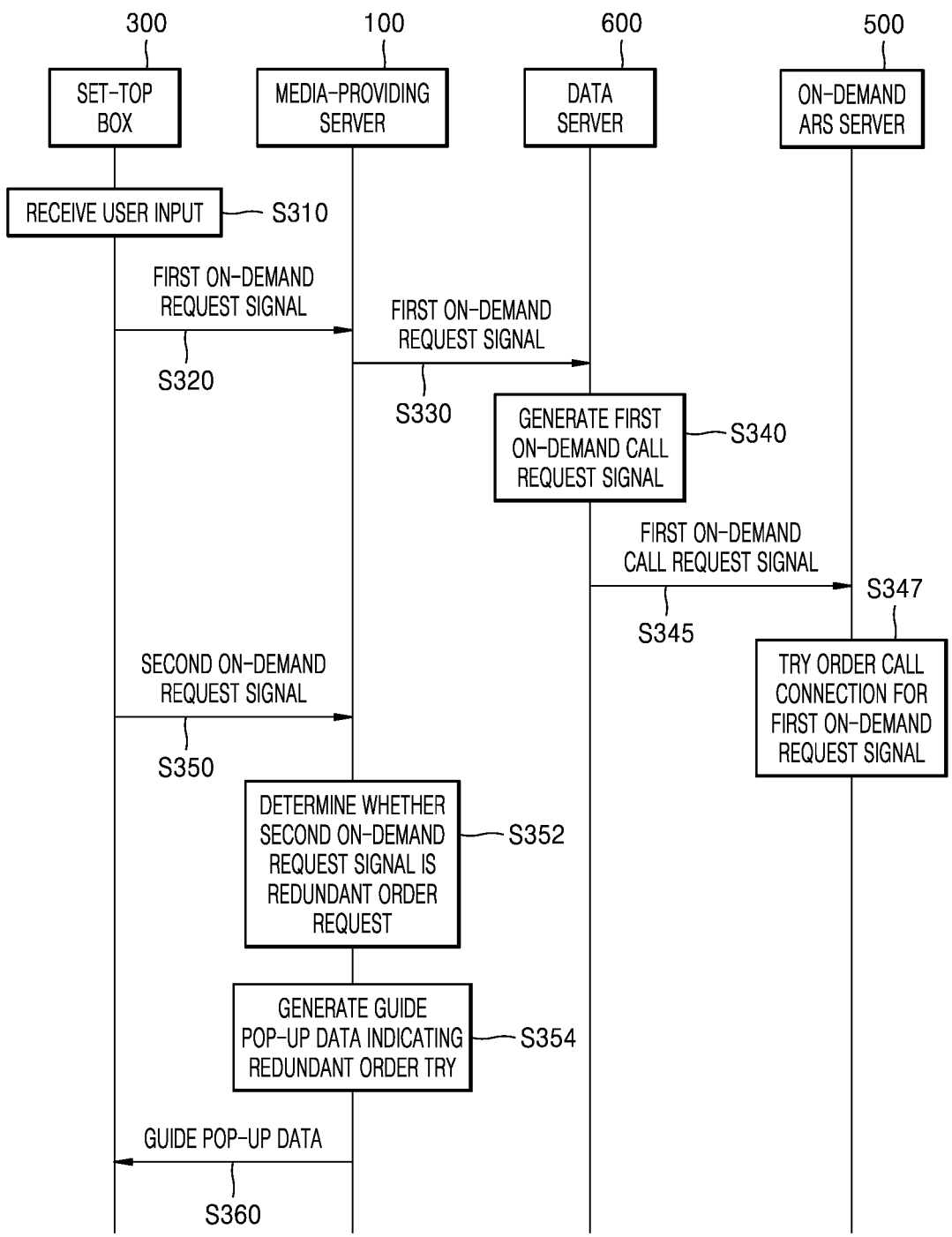
FIG. 6 is a flowchart of a method of processing a redundant order request according to an embodiment of the present disclosure.

FIG. 6 is a flowchart of a method of processing a redundant order request according to an embodiment of the present disclosure.

As illustrated in FIG. 6, in processes S310, the set-top box 300 obtains the user input requesting the on-demand order, and transmits, to the media-providing server 100, the first on-demand request signal including the identification information of the set-top box and the video identification information of the commerce content (S320).

In processes S330, the media-providing server 100 transmits to the data server 600, the first on-demand request signal including the identification information of the set-top box and the video identification information on the corresponding commerce content. The data server 600 may generate the on-demand call request signal based on the data included in the on-demand request signal, the pre-stored product data, and the user data (S340). The first on-demand call request signal may include the identification information (phone number, IP address, or the like) of the user terminal for making the order call connection to the user terminal and the information related to the product to be ordered. In another embodiment, the first on-demand call request may be generated in the data server 600, and may be generated in the media-providing server 100 and transmitted to the on-demand ARS server 500.

In process S345, the data server 600 transmits the first on-demand call request signal to the on-demand ARS server 500, and the on-demand ARS server 500 processes the order call connection corresponding to the first on-demand request signal (S347). In another embodiment, the on-demand ARS server 500 may receive the on-demand call request signal from the media-providing server 100 or receive the on-demand call request signal from the set-top box 300.

In process S350, in addition to the first on-demand request signal, the set-top box 300 may transmit the second on-demand request signal that is the same order request to the media-providing server 100.

In process S352, the media-providing server 100 may determine whether the second on-demand request signal is a redundant order request, and generate the guide pop-up data indicating that the second on-demand request is the redundant order request. In process S360, the media-providing server 100 may transmit the guide pop-up data indicating that it is the redundant order request to the set-top box 300.

Figure 7:
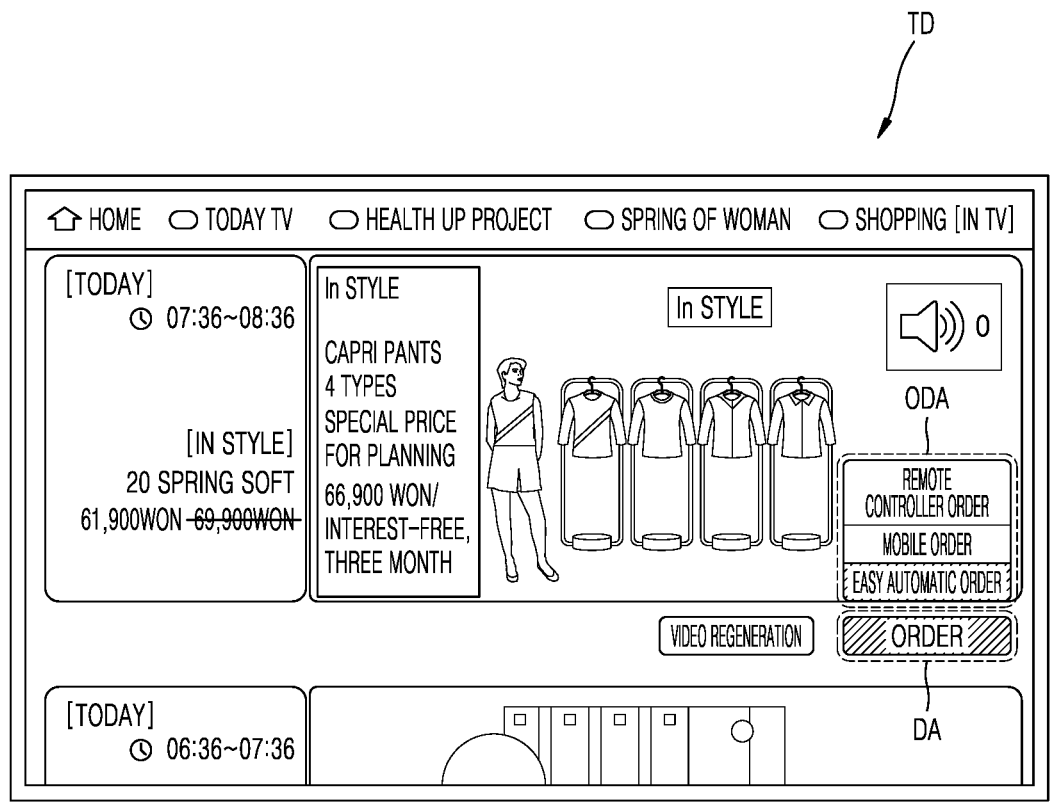
FIG. 7 illustrates an embodiment of selecting an order selection area according to an embodiment of the present disclosure.

FIG. 7 illustrates an embodiment of selecting an order selection area according to an embodiment of the present disclosure.

Referring to FIG. 7, when a user command for selecting an order selection area DA is input, an additional option area ODA may be displayed. For example, the additional option area ODA may include 'remote controller order', 'mobile order', and 'easy automatic order' options, but the present disclosure is not limited thereto and may include various additional options according to embodiments.

According to an embodiment of the present disclosure, the additional option area ODA may be displayed by overlapping a separated layer from the screen layer on which the broadcast video and the interface area are displayed. The additional option area layer may be displayed while overlapping the interface area and a partial area of the broadcast video.

Figure 8:
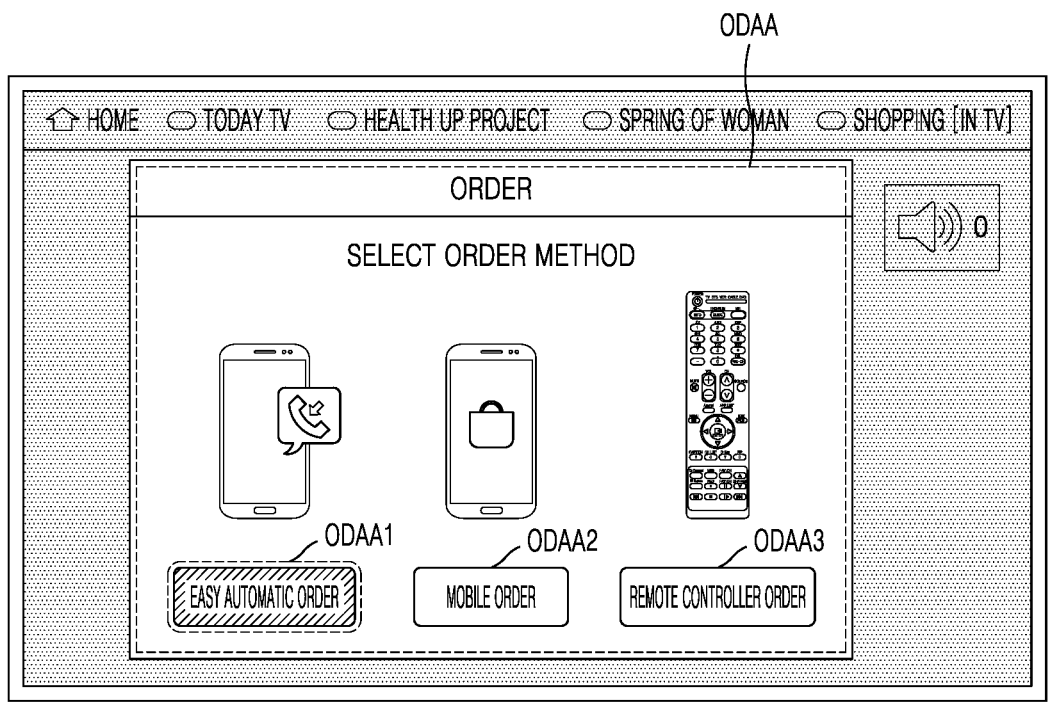
FIG. 8 illustrates an embodiment of displaying an additional option area according to an embodiment of the present disclosure.

FIG. 8 illustrates an embodiment of displaying an additional option area according to an embodiment of the present disclosure.

Referring to FIG. 8, when the user command for selecting the order selection area DA is input, the additional option area ODAA may be displayed on the overall screen through a layer separate from the screen layer where the broadcast video and the interface area are displayed.

The additional option area ODAA of the present embodiment may include a first GUI ODAA1, a second GUI ODAA2, and a third GUI ODAA3, but this is only an example, and may include various GUIs.

The user may select one option from the first GUI ODAA1 to the third GUI ODAA3 through a remote control device or the like. In this case, the set-top box 300 may execute an application to perform an operation corresponding to the option corresponding to the user input, and according to an example, the media-providing server 100 may perform all or part of the execution of the application.

Figure 9:
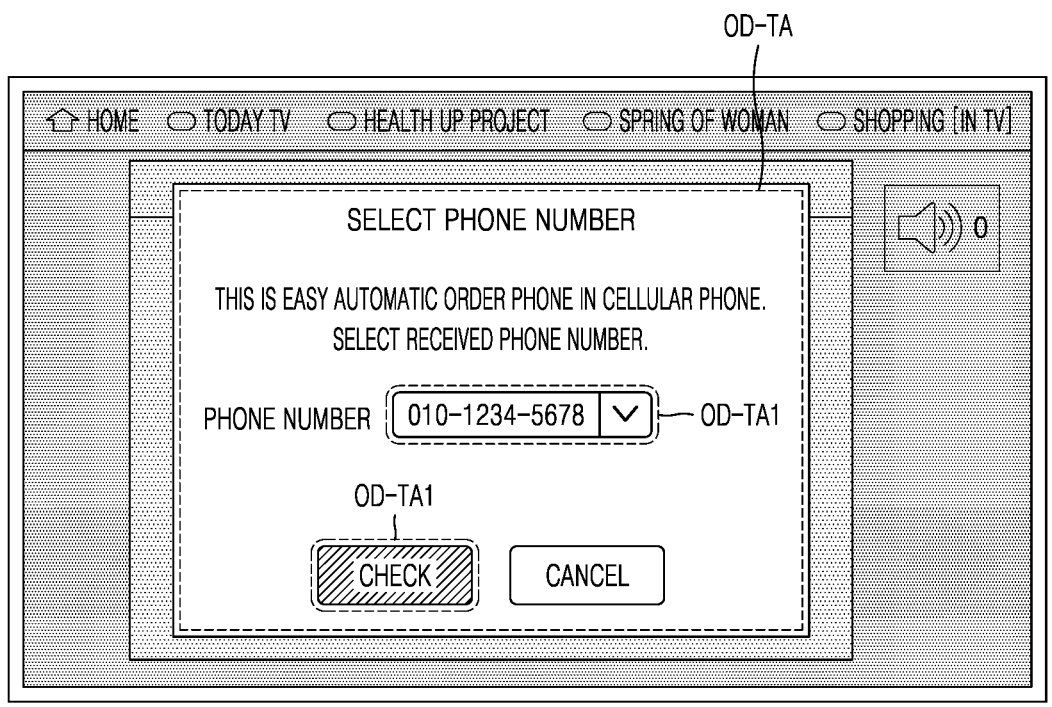
FIG. 9 illustrates an embodiment of displaying an input area OD-TA for selecting the phone number according to an embodiment of the present disclosure.

FIG. 9 illustrates an embodiment of displaying an input area OD-TA for selecting the phone number according to an embodiment of the present disclosure.

Figure 10:
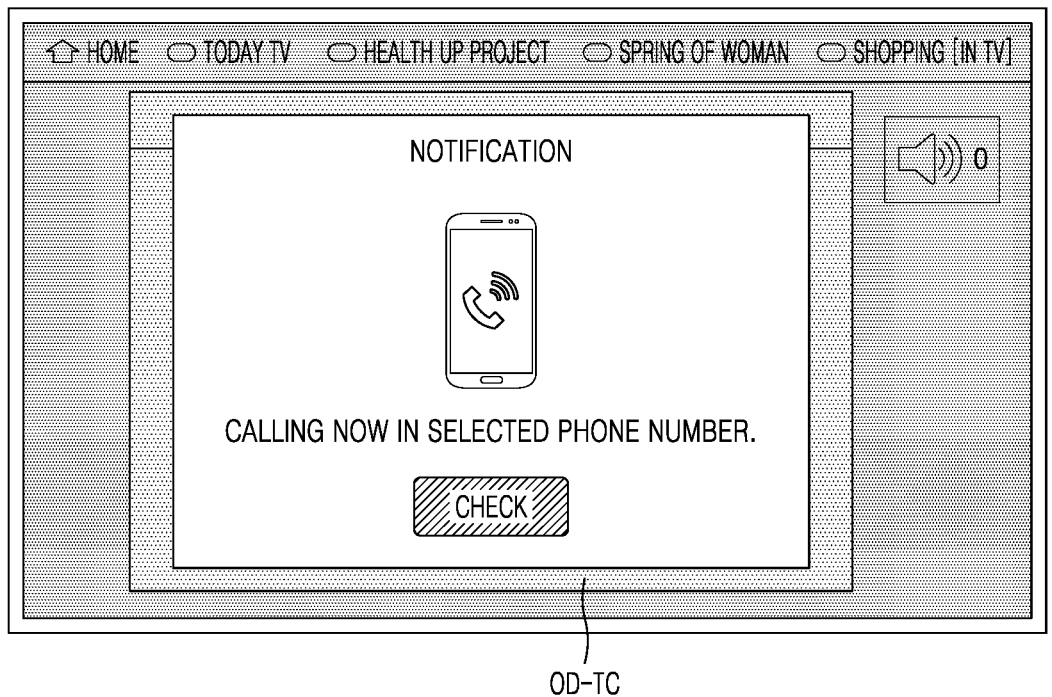
FIG. 10 illustrates an embodiment of displaying a guide screen according to an embodiment of the present disclosure.

FIG. 10 illustrates an embodiment of displaying guide screen according to an embodiment of the present disclosure.

In particular, FIG. 9 exemplarily illustrates output data generated through the media-providing server 100 for the order process after selecting the 'easy automatic order' option in FIG. 7.

Referring to FIG. 9, the output device 400 may display an input area OD-TA for selecting the phone number corresponding to the selection of the 'easy automatic order' option. The input area OD-TA may include a pre-registered phone number list OD-TA1, and the user may select, from the phone number list OD-TA1, the phone number of the user terminal T for making the call order using the remote control device or the like.

After selecting the phone number of the user terminal T for making the call order, in a case in which there is a user input for selecting a check selection GUI OD-TA1, the output device 400 may display a guide screen as illustrated in FIG. 10. Thereafter, the user terminal T may proceed a subsequent order process through the call connection with the on-demand ARS server 500.

In detail, in a case in which there is the user input for selecting the check selection GUI OD-TA1, the set-top box 300 may transmit the order request signal to the media-providing server 100, and the media-providing server 100 may control the on-demand ARS server 500 to make a call to the user terminal T based on the order request signal. During the call connection, a call connection pop-up OD-TC may be displayed on the screen of the output device 400.

Figure 11:
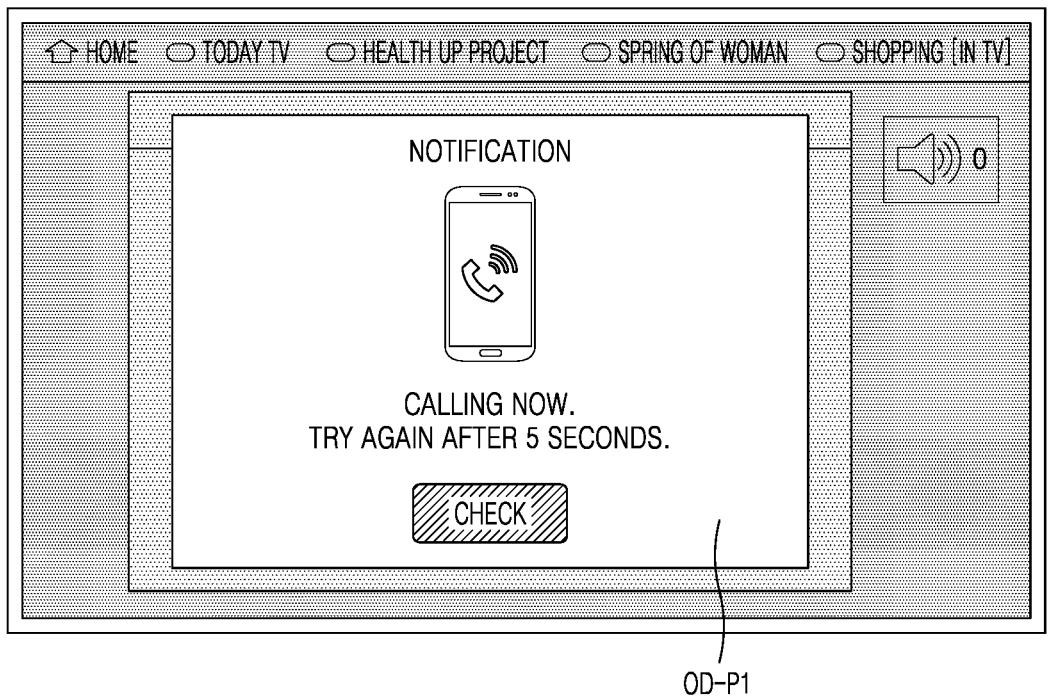
FIG. 11 illustrates an embodiment of displaying a notification that an order call is being attempted according to an embodiment of the present disclosure.

FIG. 11 illustrates an embodiment of displaying a notification that an order call is being attempted according to an embodiment of the present disclosure.

Figure 12:
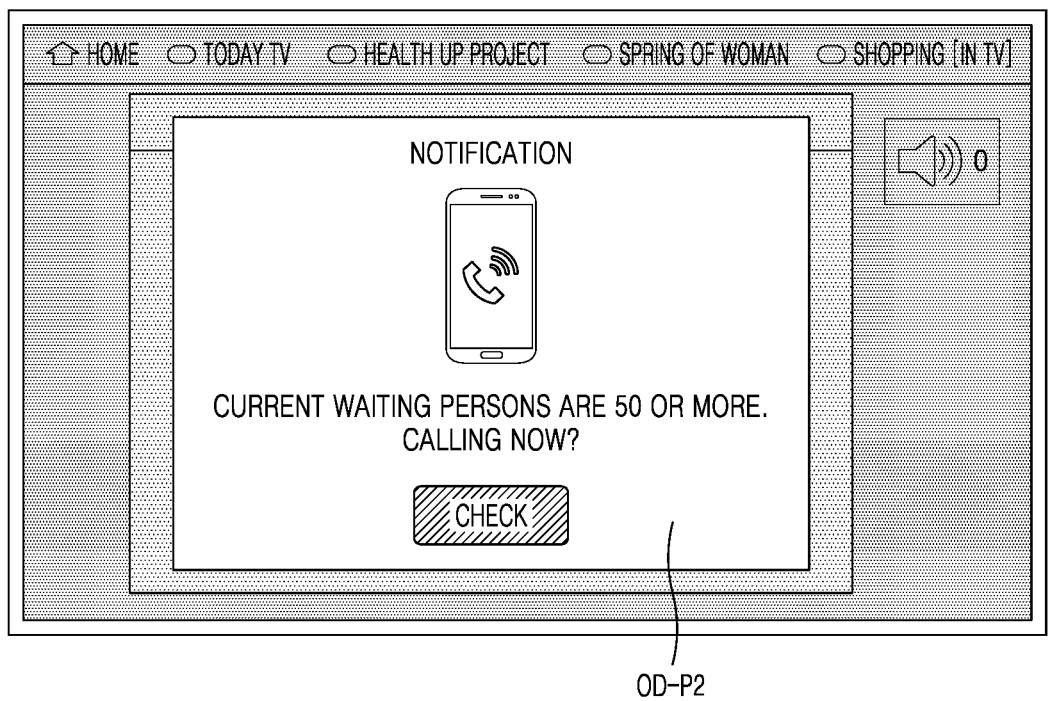
FIG. 12 illustrates an embodiment of displaying a notification that a number of waiting orders exceeds a maximum number of waiting orders be output according to an embodiment of the present disclosure.

FIG. 12 illustrates an embodiment of displaying a notification that the number of waiting orders exceeds the maximum number of waiting orders be output according to an embodiment of the present disclosure.

FIG. 13 illustrates an embodiment of displaying a notification that other media orders be output according to an embodiment of the present disclosure.

A guide pop-up data OD-P1 of a notification that an order call is being attempted may be output to the output device 400 of the set-top box 300 in which the order is input. In a case in which the waiting order information received from the on-demand ARS server 500 exceeds the maximum number of waiting orders, guide pop-up data OD-P2 of a notification that the number of waiting orders is exceeded may be output.

Guide pop-up data OD-P3 including a functional area of a notification that the number of waiting orders exceeds the number of waiting orders and other media orders (remote controller order, mobile order, or the like) may be output. The guide pop-up data OD-P3 may include a check area OD-P3-S1 and a continue connection area OD-P3-S2.

Corresponding to a selection input to the check area OD-P3-S1, output data including a remote controller order area and a mobile order area may be output. Corresponding to a selection input to the continue connection area OD-P3-S2, order output data ODAA (see FIG. 8) including the easy automatic order, the mobile order, and the remote controller order may be output.

The devices described above may be implemented as a hardware component, a software component, and/or a combination of the hardware component and the software component. For example, the devices and components described in the embodiments may be implemented by using one or more general purpose or special purpose computers, such as a processor, a controller, an arithmetic logic unit (ALU), a digital signal processor, a microcomputer, a field programmable gate array (FPGA), a programmable logic unit (PLU), microprocessor, or any other device capable of executing and responding to the instruction. The processor may perform an operating system (OS) and one or more software applications executed on the operating system. The processor may also access, store, manipulate, process, and generate data corresponding to execution of the software. For convenience of understanding, although one processor is sometimes described as being used, those ordinary skilled in the art will recognize that the processor may include a plurality of processing elements and/or a plurality of types of processing elements. For example, the processor may include a plurality of processors or one processor, and one controller. Other processing configurations are also possible, such as a parallel processor.

Software may include a computer program, a code, an instruction, or a combination of one or more of these, configure the processor to operate as desired, or command the processor independently or collectively. The software and/or data may be permanently or temporarily embodied in any kind of machine, component, physical device, virtual equipment, computer storage medium or device, or a signal wave to be transmitted to be interpreted by the processor or to provide instructions or data to the processor. The software may be distributed over computer systems connected via a network to be stored or executed in a distributed manner. The software and data may be stored in one or more computer-readable recording media.

The method according to the embodiment may be implemented in a form of program instructions that may be executed through various computer means to be recorded in a computer-readable medium. The computer-readable medium may include a program instruction, a data file, a data structure, and the like alone or in a combination thereof. The program instructions recorded on the medium may be specially designed and configured for the embodiments, or may be known and used by those skilled in the art of computer software. Examples of the computer-readable recording medium include magnetic media such as a hard disk, a floppy disk, and a magnetic tape, optical media such as CD-ROM and DVD, magneto-optical media such as a floptical disks, magneto-optical media, and a hardware device specially configured to store and execute program instructions, such as a ROM, a RAM, and a flash memory. Examples of program instructions include not only machine language codes such as those generated by a compiler, but also high-level language codes that may be executed by a computer using an interpreter or the like. The hardware devices described above may be configured to operate as one or more software modules to execute the operations of the embodiments, and vice versa.

The media-providing system, the media-providing method, and the computer program therefor according to the embodiments of the present disclosure may process the on-demand request for the commerce content.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of processing an on-demand request for commerce content, the method comprising:
   transmitting, by a media-providing server, on-demand content related to commerce content to a set-top box;
   receiving a first on-demand request signal for the on-demand content from the set-top box and transmitting the first on-demand request signal to a data server, by the media-providing server;
   in response to the first on-demand request signal, generating, by the data server, an on-demand call request signal including a product code of the commerce content and a user code of the set-top box and transmitting the on-demand call request signal to an on-demand ARS server;
   generating process status information by the on-demand ARS server; and
   receiving the process status information on the on-demand call request signal from the on-demand ARS server and transmitting, by the data server, a first message corresponding to the process status information to a user terminal corresponding to the first on-demand request signal;
   wherein the process status information includes whether an order call connection to the user terminal is normally terminated or abnormally terminated.

2. The method of claim 1, further comprising:
   when the process status information on the on-demand call request signal is unavailable, generating a second message including a function of regenerating the on-demand call request signal, in response to call inability, and transmitting, by the data server, the second message to the user terminal corresponding to the first on-demand request signal.

3. The method of claim 1, further comprising:
   receiving a second on-demand request signal for the on-demand content from the set-top box;
   determining, with the media providing server, whether the second on-demand request signal is a redundant order attempt of the first on-demand request signal;
   upon determination that the second on-demand request signal is the redundant order attempt, transmitting, with the media providing server, guide pop-up data indicating that a redundant order attempt has been made to the set-top box; and
   skipping, with the media providing server, processing of the second on-demand request signal.

4. The method of claim 1, further comprising:
   receiving waiting order information included in the process status information from the data server;
   generating guide pop-up data corresponding to the waiting order information; and
   transmitting the guide pop-up data to the set-top box, by the media-providing server.

5. The method of claim 1, further comprising:
   receiving waiting order information included in the process status information from the data server;
   generating guide pop-up data indicating that a maximum number of waiting orders is exceeded when detecting that the waiting order information exceeds a preset maximum number of waiting orders;
   transmitting the guide pop-up data to the set-top box, by the media-providing server;
   receiving, from the set-top box, a check request signal for the guide pop-up data indicating that the maximum number of waiting orders is exceeded; and in response to the check request signal, transmitting the first on-demand request signal to the on-demand ARS server through the data server, by the media-providing server.

6. A computer-readable storage medium in which instructions for executing the method of claim 1 are stored.

7. A method of processing an on-demand request, the method comprising:
receiving, from a subscriber machine, a first on-demand request signal in response to on-demand content at a first server;
in response to the first on-demand request signal, generating, with a second server, an on-demand call request signal including a content identification code associated with the on-demand content and a subscriber code;
generating, with an on-demand ARS server, process status information on the on-demand call request signal,
wherein the process status information includes whether an order call connection to the user terminal is normally terminated or abnormally terminated; and
generating, with the second server, a first message corresponding to the process status information to the subscriber machine.

8. The method of claim 7, further comprising:
when the process status information on the on-demand call request signal is unavailable, generating a second message including a function of regenerating the on-demand call request signal, in response to call inability; and
transmitting, by the second server, the second message to the subscriber machine.

9. The method of claim 7, further comprising:
receiving, from the subscriber machine, a second on-demand request signal for the on-demand content;
determining, with the first server, whether the second on-demand request signal is a redundant order attempt of the first on-demand request signal;
upon determination that the second on-demand request signal is the redundant order attempt, generating, with the first server, first data prompting first notification indicating that a redundant order attempt has been made to a set-top box; and
forgoing, with the first server, to process the second on-demand request signal.

10. The method of claim 7, further comprising:
receiving waiting order information included in the process status information from the second server;
generating second data prompting second notification corresponding to the waiting order information; and
transmitting, with the first server, the second data to the subscriber machine.

11. The method of claim 7, further comprising:
generating, with the second server, waiting order information included in the process status information;
determining whether the waiting order information exceeds a preset maximum number of waiting orders;
generating third data prompting third notification indicating that a maximum number of waiting orders is exceeded upon determination that the waiting order information exceeds the preset maximum number of waiting orders; and
transmitting, with the first server, the third data to the subscriber machine.

12. The method of claim 11, further comprising:
receiving a check request signal responsive to the third notification indicating that the preset maximum number of waiting orders is exceeded; and in response to the check request signal, transmitting, with the first server, the first on-demand request signal to the third server through the second server.

13. A media-providing system comprising:
a data server; and
a media-providing server configured to:
transmit on-demand content related to commerce content to a set-top box
receive a first on-demand request signal for the on-demand content from the set-top box; and
transmit the first on-demand request signal to a data server;
the media providing server further including a communication unit communicating with the set-top box and the data server, and a processor for controlling operations of the media-providing server, and
an on-demand ARS server configured to generate process status information,
the data server configured to:
generate an on-demand call request signal including a product code of the commerce content and a user code of the set-top box, in response to the first on-demand request signal;
transmit the on-demand call request signal to an on-demand ARS server;
receive process status information on the on-demand call request signal from the on-demand ARS server; and
transmit a first message corresponding to the process status information to a user terminal corresponding to the first on-demand request signal;
wherein the process status information includes whether an order call connection to the user terminal is normally terminated or abnormally terminated.

14. The media-providing system of claim 13, wherein the data server, when the processing status information on the on-demand call request signal indicates that a call is unavailable, generates a second message including a function of regenerating the on-demand call request signal in response to call unavailability, and transmits the second message to a user terminal corresponding to the first on-demand request signal.

15. The media-providing system of claim 13, wherein the processor of the media-providing server is further configured to:
determine whether a second on-demand request signal is a redundant order attempt of the first on-demand request signal, when receiving the second on-demand request signal for the on-demand content from the set-top box,
transmit guide pop-up data indicating that a redundant order attempt has been made to the set-top box, when the second on-demand request signal is the redundant order attempt, and skips processing for the second on-demand request signal.

16. The media-providing system of claim 13, wherein the processor of the media-providing server receives waiting order information included in the process status information from the data server, generates guide pop-up data corresponding to the waiting order information, and transmits the guide pop-up data to the set-top box.

17. The media-providing system of claim 13, wherein the processor is further configured to:
receive waiting order information included in the process status information from the data server;

when it is detected that the waiting order information has exceeded a preset maximum number of waiting orders, generate guide pop-up data indicating that a maximum number of waiting orders has been exceeded and transmits the guide pop-up data to the set-top box;

receive a check request signal for the guide pop-up data indicating that the waiting orders have been exceeded from the set-top box; and transmit the first on-demand request signal corresponding to the check request signal to the on-demand ARS server through the data server.

18. The media-providing system of claim 13, wherein the processor of the media-providing server is further configured to generate a set of data prompting different user notifications corresponding to the process status information.

19. The media-providing system of claim 18, wherein the set of data prompting the different user notifications is output as a pop-up display on the user terminal.

20. The media-providing system of claim 19, wherein the media-providing server is operable to receive a check request signal in response to the pop-up display from the user terminal.

* * * * *